Figure 1:
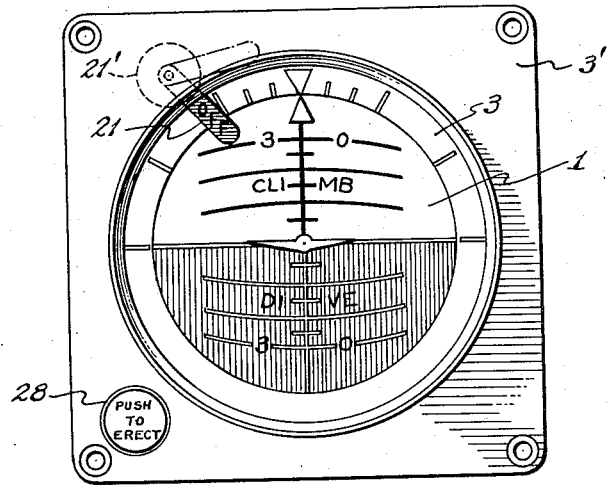

April 7, 1959 J. M. JESSUP 2,880,618
QUICK ERECTING MEANS FOR GYRO VERTICALS
Filed Sept. 27, 1957 2 Sheets-Sheet 1

INVENTOR
JOHN M. JESSUP
BY
Herbert H. Thompson
ATTORNEY

April 7, 1959  J. M. JESSUP  2,880,618
QUICK ERECTING MEANS FOR GYRO VERTICALS
Filed Sept. 27, 1957  2 Sheets-Sheet 2

INVENTOR
JOHN M. JESSUP
BY
Herbert H. Thompson
ATTORNEY

United States Patent Office 2,880,618
Patented Apr. 7, 1959

2,880,618

QUICK ERECTING MEANS FOR GYRO VERTICALS

John M. Jessup, Grand Rapids, Mich., assignor to Sperry Rand Corporation, Great Neck, N.Y., a corporation of Delaware Application September 27, 1957, Serial No. 686,723

12 Claims. (Cl. 74—5.47)

This invention relates to gyro verticals for aircraft and other vehicles in which means are provided for quickly erecting the gyro when starting up or in case the gyro is tumbled or badly disturbed during flight. For these purposes, I prefer to employ a timed cycle of operation by which the gyro is quickly brought up to speed and quickly erected without nutation and returned to the normal erection rate automatically after the gyro has reached the vertical. I prefer also to provide a means for warning the aviator not to rely on the gyro vertical in case it is in a quick erection mode of operation.

My preferred cycle of operation following the closing of the main supply switch to the gyro is as follows. For a first period which comprises preferably about fifteen seconds full power is applied to the spinning rotor, but the increased torques for fast erection are delayed during this period. At this time, the circuit may be such as to apply low torques to erect the gyro at a normal rate but normally the erection circuits are inoperative during this period because my gyro vertical is also equipped with a turn error preventing means in the form of a bank angle cutout means for disabling the erectors in case the relative inclination of the gyro and craft about the roll axis exceeds a few degrees, such as 6 degrees, and such inclination is usually exceeded in starting up because the gyro usually comes to rest when shut down in an inclined position.

In case, however, the gyro is within the 6 degrees of the vertical and the craft is level at the time, such as when on the ground, the normal low erection torque system may remain in operation during this period. Due to the slow rotation of the gyro rotor at this time, appreciable erection takes place especially about the pitch axis. Following this short period, there is a second period of about thirty to forty-eight seconds or more during which period the erection rate is greatly increased about both axes. I prefer to delay the fast erection rate during the initial fifteen-second period because if the fast erection rate is applied while the gyro is still rotating slowly, violent nutation of the gyro may be set up.

During the fast erection rate, I prefer to warn the pilot not to rely on the instrument. For this purpose, I employ a warning flag which is brought into view during the fast erection rate, but is concealed during normal erection rate. Once the fast erection rate is initiated, it continues until the gyro is leveled about both axes so that a fast erection rate is maintained about both axes, even though the controller about one axis may show that the gyro is level about that axis. As soon as the gyro is level about both axes, the fast erection rate, which may be on the order of ninety to one hundred degrees a minute, is cut out and the normal erection rate (on the order of 2 to 2½ degrees a minute) is put in operation and the warning flag moved out of view.

I also prefer to provide means whereby the pilot may initiate a fast erection rate at any time by pushing a button which puts the fast erection cycle into operation manually but which is again thrown out automatically as soon as the gyro becomes level about both axes.

Figure 2:
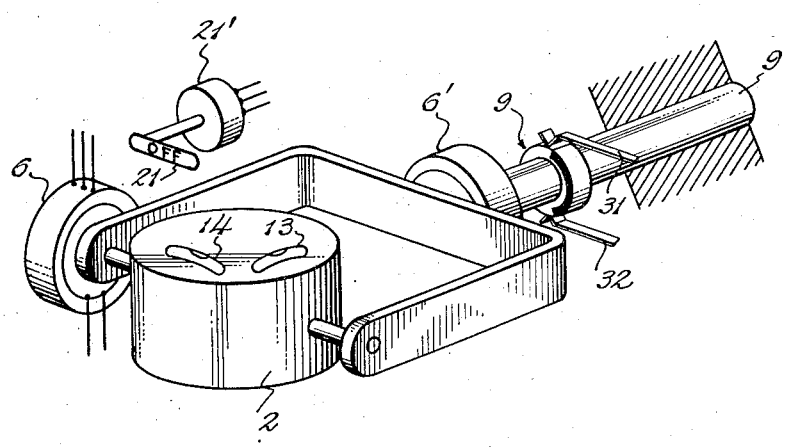
Figure 3:
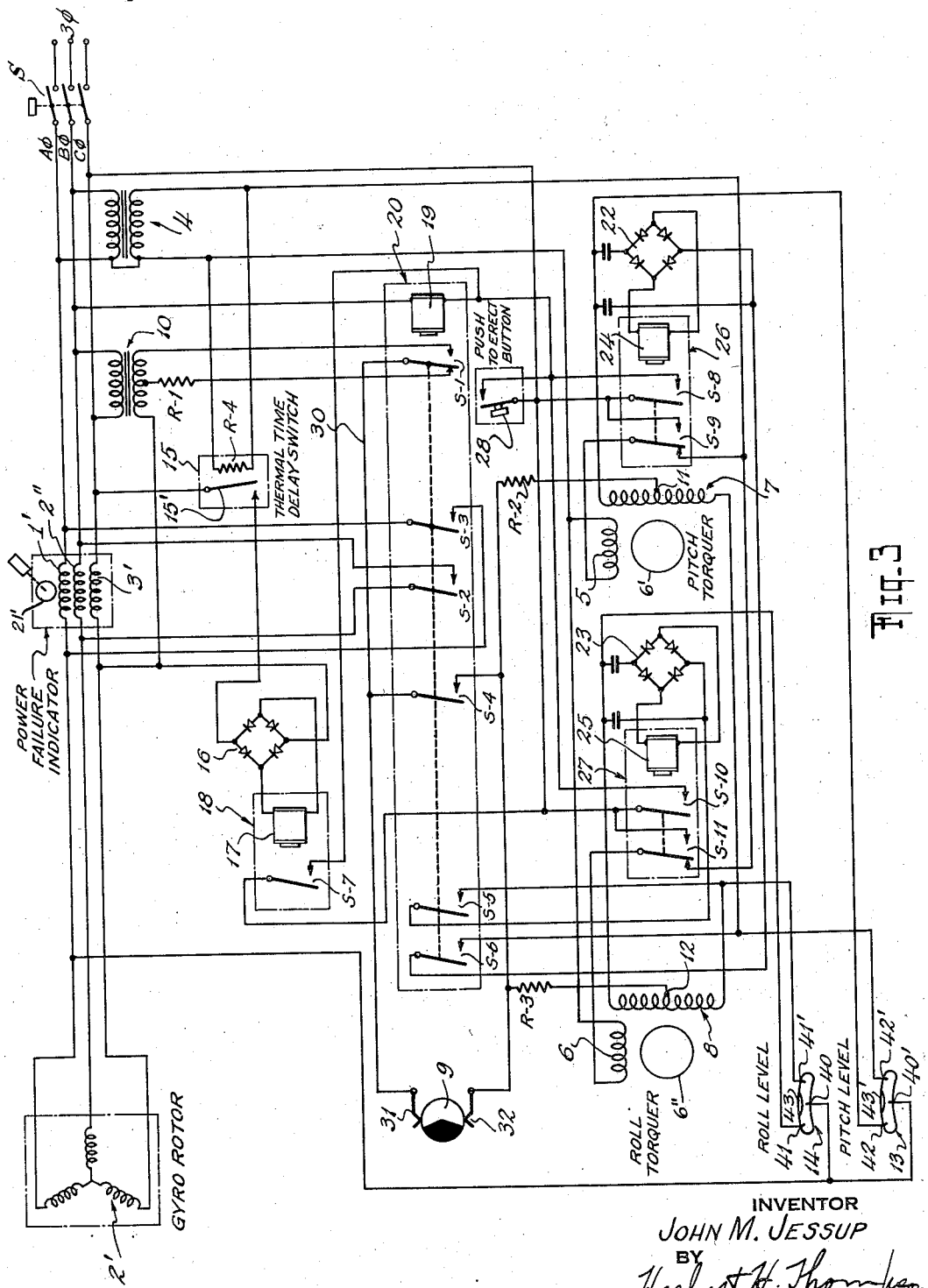

Referring to the drawings showing a preferred form of the invention, Fig. 1 is a face view of an attitude indicator containing my gyro vertical;

Fig. 2 is a perspective view of the gyro vertical within the attitude indicator which is surrounded by a graduated sphere showing attitude; and Fig. 3 is a wiring diagram showing the several cycles of operation of the invention.

The attitude indicator in Fig. 1 is of conventional form having a universally mounted graduated sphere 1 enclosing and stabilized by the gyroscope 2 to provide an artificial horizon showing both roll and pitch against graduations on the ring 3 surrounding the face of the housing 3'. It is preferably equipped with a warning flag 21 to show power failure, as described in the patent to Early, Jr., and Fitter 2,734,279, dated February 14, 1956, which flag I also employ for the purpose of showing when the gyro is in the fast erection mode. The gyro vertical proper 2 is provided with gravitationally responsive controllers such as liquid levels 13 and 14 about the pitch and roll axes, respectively, and which respectively control the pitch and roll torquers 6' and 6" acting about axes at right angles to the respective axes of the liquid levels. An electrolyte is employed in the levels, each level having a central supply contact 40, 40' and a pair of upper contacts 41, 41', 42, 42' on opposite sides of the air bubble 43, 43' (Fig. 3).

I also provide a means for eliminating or altering the erection torques during turns and show a simple method of performing this function in the form of a bank angle limit switch or commutator 9 about the roll axis having fixed brushes 31 and 32 which serves to render at least the roll torquer and preferably both torquers inoperative in case the bank angle exceeds a certain small limit, say 6 degrees, which I take as the measure of a critical rate of turn beyond which a substantial error would otherwise be caused in the gyro. In other words, since a turn is accompanied by a bank, I employ a bank angle responsive device as a detector of turns at a sufficient rate to disturb the gyro if the normal erection device is allowed to act during this time.

Referring now to the wiring diagram, I have shown a three-wire three-phase supply (A, B and C) for spinning the rotor and operating the entire control system. When the main switch S is closed, full voltage is supplied to the polyphase gyro rotor 2' which is shown as also passing through coils 1', 2" and 3' on the small torquer or motor 21' for the power failure flag indicator 21. At first, therefore, the warning flag is invisible, that is, moved out of the field of view into the dotted line position in Fig. 1. The time that the flag remains invisible after the closure of switch S is short since this initial phase only lasts about fifteen seconds.

During this time, the transformer 4 supplies low voltage to the fixed fields 5 and 6 of the pitch and roll torque motors, respectively, because switches S9 and S11 are in the position shown in Fig. 3, but the torquers are normally inoperative since no voltage is applied to the control fields 7 and 8, respectively, due to the fact that the bank angle switch 9 is not in a conducting position in starting up because of the random inclination of the gyro, as explained hereinbefore. However, if the gyro were initially aligned in roll with the craft, the control fields of the pitch and roll torquers 6' and 6" would be energized by a low voltage supplied from the center tap of transformer 10 through resistor R1, switch S1 of relay 20, bank angle switch 9, resistors R2 and R3 to the center taps 11 and 12 on the control field windings 7 and 8 of the torquers, and by the voltage applied by the liquid levels 13 and 14 at either end of the control fields depending from the direction and axis of tilt, causing the torquers to erect the gyro to the vertical at a rate slower than the fast erection rate.

Closing of the main switch S also starts to heat up the resistor R4 of the thermal time delay switch 15 which is connected to the secondary of transformer 4 across the A and B supply leads. Heating up this relay closes the switch 15' after a fifteen second delay and applies a voltage across rectifier 16 of relay 18 which energizes its magnet 17 and closes the switch S7. Closing this switch completes a circuit through the relay coil 19 of the master multicontact relay 20 which performs a number of functions in the system. First, it greatly increases the respective voltage supplied to the roll and pitch torquers 6' and 6" to establish a fast control from the liquid level devices 13 and 14. Secondly, it short circuits two of the three polyphase windings 1' and 2" on the power failure motor 21' to cause the flag to appear, and thirdly, it shorts out roll cutout switch 9. The first-named function is accomplished in part by the contact S1 which breaks the circuit through resistor R1 to the center tap of the secondary on transformer 10 and completes a circuit to the end of said secondary to supply a higher voltage to the lead 30 between the leads A and C. The C lead is connected to the brush 31 on the roll cutout switch 9, the other brush 32 being connected to the center taps on the control winding 8 of roll torquer 6" and the control winding 7 of pitch torquer 6' through resistors R3 and R2, respectively.

Switch S4 controlled by relay 20 is also connected across brushes 31 and 32 of commutator 9 to short circuit or cut out the roll cutout switch so that fast erection will take place, regardless of the position of the gyro during the quick erection cycle, since the craft is stationary on the ground at that time and not turning.

The contacts S2 and S3, when coil 19 is energized, short out the windings 1' and 2" so that the power failure motor 21' is energized at this time only by the one winding 3'. As the gyro rotor picks up speed, the current through the winding 3' falls so that the current becomes insufficient to hold the flag out of view and it drops down into view where it remains during most of the quick erection cycle. The flag also drops into view upon power failure, being biased to the warning position.

This falling off of supply current also reduces the voltage drop across the rectifier bridge 16 so that relay 18 is deenergized, allowing switch S7 to reassume its open position. However, the coil 19 of relay 20 remains energized because of the closed position of switches S5 and S6. That is, closing S5 and S6 energizes magnets 24 and 25 of relays 26 and 27, closing switches S8, S9, S10 and S11 and connecting the liquid levels 13 and 14 in circuit with the control fields 7 and 8 of the roll and pitch torquers causing the current signals from the liquid levels to pass through the rectifiers 22 and 23 and through the magnets 24 and 25 of relays 26 and 27, in the pitch channel and in the roll channel, respectively. When closed, switches S8 and S10, respectively, provide a means for holding the coil 19 of relay 20 energized by placing the line voltage from the C power lead on one side of the coil 19 while the other side remains connected as before to the B lead.

It should be noted that closure of either or both S8 and S10 will maintain the coil 19 energized. Thus, if the gyro is erected in roll prior to erection in pitch, current flow from the roll liquid level 14 will cease, deenergizing relay 27 and releasing switch S10, but the coil 19 will still be held since the pitch relay 26 will still be energized with the current flowing from the pitch liquid level 13 to the pitch rectifier 22, thereby maintaining a voltage across the coil 19 through switch S8.

The other two switches S9 and S11 of relays 26 and 27 are effective in furnishing the full voltage across the A and C leads to the fixed fields 5 and 6 of the pitch and roll torquers. This applies an increased voltage across the torquer's fixed fields 5 and 6 during this mode. The increased voltages to the fixed fields and to the center tap of the torquer fields as controlled from the liquid levels quickly erect the gyro in pitch and roll at a rate preferably on the order of 90 degrees per minute. Quick erection persists as long as an output signal is obtained from both or either of the liquid levels, as explained above.

When the gyro is level, the currents from both liquid levels are reduced to zero deenergizing the pitch and roll sensitive relays 26 and 27 thus breaking the hold of the main coil 19 to deenergize relay 20 and opening all of its switches. Opening of the switches S2 and S3 will restore full excitation to the power failure indicating motor 21 so that the warning flag is again removed from view to indicate the instrument is ready to be used for reference. At the same time, the increased voltage to the control fields and fixed fields are eliminated and the original smaller voltage reinstated as described initially. Restoration of normal operation of the torquers is accordingly dependent on a null output from the gravitationally responsive means. Since the gyro is vertical, the bank angle switch 9 is positioned so that it provides a direct path through which a voltage from transformer 10 can be delivered to the control fields of the torquers instead of through switch S4 which is now open. The system at this time is in its normal mode of operation and deviations from the vertical in pitch and roll as sensed by the corresponding liquid levels are corrected at the slow rate of approximately 2½ degrees a minute. The entire cycle above described is generally completed in slightly less than a minute. It may be noted that failure of any one of the relays involved will discontinue quick erection but permit the normal erection mode to be operated at all times.

It will be understood that when the gyro is level no torque is exerted because equal voltages are applied to the two opposed windings in each torquer 6' and 6" as controlled by the leads from contacts 41, 41', 42, 42' in the levels, but this balance is disturbed when the bubble 43 or 43' in the liquid interrupts the current flow through one of the two contacts between each liquid level and its torquer.

Preferably also I provide a means for bringing the quick erection means into operation at will as well as during the starting up procedure so that the aviator may quickly erect the gyro during flight in case it tumbles or it assumes an obviously incorrect position. For this purpose, I provide a push button 28, which, when pressed, applies a voltage to the coil 19 of relay 20 and thus performs the same function as the relay 18 and switch S7 during the starting up procedure. By exciting coil 19, the group of switches in relay 20 is moved to the alternative position as before, closing the holding switches S8 and S10 in relays 26 and 27 as before so that coil 19 will remain excited after the button is released and until the gyroscope is level about both axes as in the starting cycle above described. The button 28 is preferably pressed only when the craft is flying at a uniform speed in a straight line, since during turns or rapid acceleration a quick erection device would erect a gyroscope to the virtual vertical instead of the true vertical (because the levels are as responsive to acceleration forces as to gravity) which is undesirable. Therefore, it is best for the aviator not to press the button during turns or rapid acceleration.

It should be noted that pressing the button 28 will start the quick erection cycle regardless of the attitude of the airplane or gyro at the time, since the roll cutout switch 9 is bypassed by the closing of switch S4 in relay 20. On the other hand, as soon as the gyro becomes erect and relay 20 deenergized, the roll cutout switch 9 resumes control and eliminates erection during turns producing a bank angle of more than about 6 degrees.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A quick starting means for gyro verticals having gravitationally responsive means, electrical torquers controlled thereby for normally erecting the gyro at a normal rate, a starting switch for the gyro, means brought into action thereby for temporarily increasing the torques exerted by said torquers, and means dependent on a null output from said gravitational means for disabling said torque increasing means to restore the torquers to normal operation.

2. A quick starting means for gyro verticals as claimed in claim 1, including a second switch for bringing said torque increasing means into action after the gyro is up to speed.

3. A quick starting means for gyro verticals having gravitationally responsive means, electrical torquers controlled thereby for erecting the gyro at a slow rate, a starting switch for the gyro, means brought into action thereby for temporarily increasing the torque exerted by said torquers, means dependent on a null output from said gravitational devices for disabling said torque increasing means, and means for initially delaying the operation of said torque increasing means for a short period after starting up to lessen nutation.

4. In a quick erection system for gyro verticals, a normal erection system therefor for exerting a weak torque thereon upon inclination causing slow erection thereof, a starting switch for the gyro, delayed action means brought into action thereby for temporarily boosting the strength of such torque for quick erection, and an indicator controlled by said delayed action means providing a warning of the operational condition of the vertical.

5. In a gyro vertical for craft, an electrical torquer about each of the roll and pitch axes of the gyro, gravitationally responsive devices for controlling said torquers, means for temporarily boosting the voltage supplied to said torquers to increase the rate of erection, and means dependent on a null output from both gravitational devices for disabling the boosting means for both torquers.

6. A gyro vertical as claimed in claim 5, in which said boosting means may be brought into action either manually at will with the gyro up to speed or automatically during the starting up of the gyro.

7. In a gyro vertical for craft, electrical torquers about the roll and pitch axes of the gyro, gravitationally responsive devices for controlling said torquers, means responsive to a roll angle exceeding a predetermined small tilt for severing the control of said torquers from said devices, means for temporarily boosting the voltage supplied to said torquers to increase the rate of erection, and means conditioned by said boosting means for rendering said severing means ineffective during such period.

8. In a gyro vertical for craft, electrical torquers about the roll and pitch axes of the gyro, gravitationally responsive devices for controlling said torquers, means responsive to a roll angle exceeding a predetermined small tilt for severing the control of said torquers from said devices, means for temporarily boosting the voltage supplied to said torquers to increase the rate of erection for a period, means conditioned by said boosting means for rendering said severing means ineffective during such period, and means dependent on a null output from said gravitational devices for disabling said boosting means.

9. In a gyro vertical, a normal erection system therefor for exerting a weak torque thereon upon inclination for slow erection thereof, a starting switch, means brought into action thereby for increasing the strength of such torques for quick erection, an indicator controlled by said quick erection means providing a marking of the operational condition of the vertical, and means dependent on a null output from the normal erection system for disabling said quick erection means and nulling said warning indicator.

10. A gyro vertical as claimed in claim 9, having means for initially delaying the operation of said quick erection means after starting up to lessen nutation.

11. In a gyro vertical, electrical torquers about the roll and pitch axes of the gyro, gravitationally responsive devices for controlling said torquers, means for temporarily boosting the electrical supply to said torquers from said devices to increase the rate of erection during starting, and means for delaying the operation of said boosting means for a short time during the initial starting period to lessen nutation.

12. In a gyro vertical, electrical torquers about the roll and pitch axes of the gyro, gravitationally responsive devices for controlling said torquers, means for temporarily boosting the electrical supply to said torquers from said devices to increase the rate of erection during starting, comprising a relay energized by an input to the gyro to close a switch when the vertical is started, said relay switch opening when the gyro approaches normal rotational speed, a second relay excited by the closing of said switch, respective second switches to boost the voltage supplied to the two respective torquers about the two axes of the gyro, means for holding said second switches in closed condition when the switch of said first relay opens, and means dependent on a null output from both of said devices to both torquers for disabling said holding means to render said boosting means ineffective.

References Cited in the file of this patent

UNITED STATES PATENTS

| | | |
|---|---|---|
| 2,446,180 | Hoskins | Aug. 3, 1948 |
| 2,716,894 | Nichols et al. | Sept. 6, 1955 |

UNITED STATES PATENT OFFICE
CERTIFICATE OF CORRECTION

April 7, 1959

Patent No. 2,880,618

John M. Jessup

It is hereby certified that error appears in the printed specification of the above numbered patent requiring correction and that the said Letters Patent should read as corrected below.

Column 4, line 15, for "motor 21" read -- motor 21′ --; column 6, line 44, for "switch," read -- switch to close --.

Signed and sealed this 5th day of April 1960.

(SEAL)
Attest:
KARL H. AXLINE
Attesting Officer

ROBERT C. WATSON
Commissioner of Patents